No. 758,901. Patented May 3, 1904.

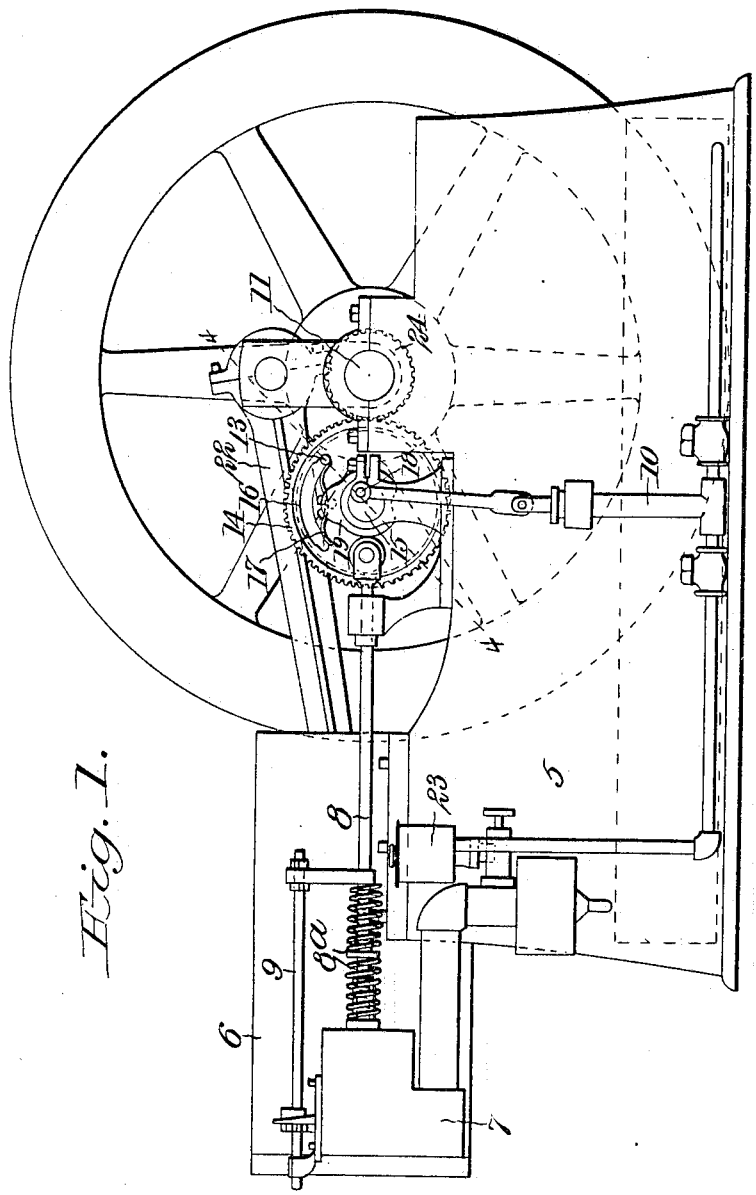

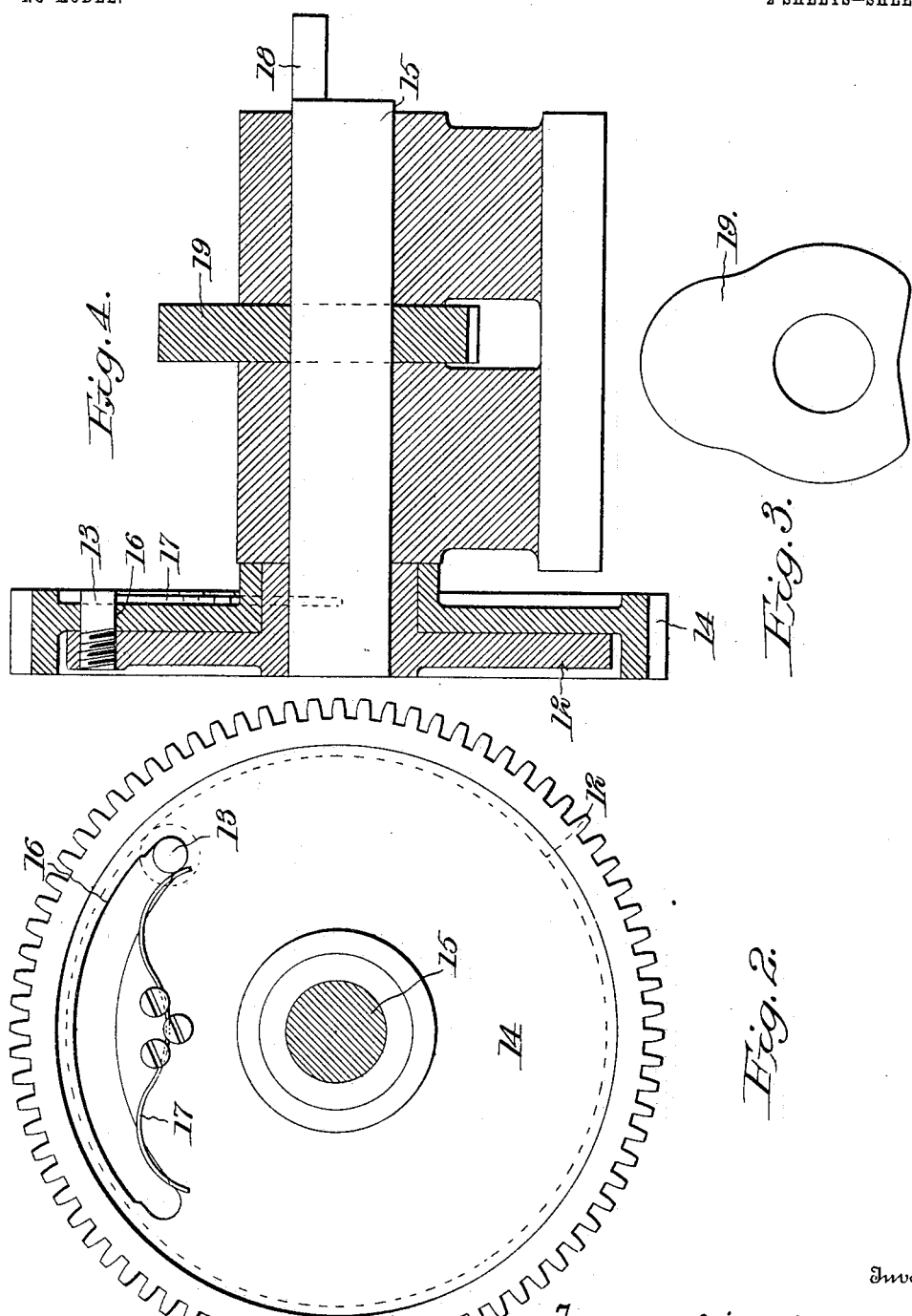

UNITED STATES PATENT OFFICE.

FRANK DICKINSON, OF SPRINGPORT, MICHIGAN.

VALVE-GEAR FOR GAS-ENGINES.

SPECIFICATION forming part of Letters Patent No. 758,901, dated May 3, 1904.

Application filed June 13, 1903. Serial No. 161,274. (No model.)

*To all whom it may concern:*

Be it known that I, FRANK DICKINSON, a citizen of the United States, residing at Springport, in the county of Jackson and State of Michigan, have invented new and useful Improvements in Valve-Gear for Gas-Engines, of which the following is a specification.

This invention relates particularly to a reversing valve-gear for a four-cycle gas-engine, and has for its object to produce a simple and improved gear whereby the engine may be reversed and the operation of the valves and oil-pump changed accordingly. In effecting this object a symmetrical cam is used, together with a reduction-gearing, one wheel of which may be shifted to a proper position to enable the cam to operate the valves in accordance with the change of direction of the engine.

The invention is more fully described below and is illustrated in the accompanying drawings, in which—

Figure 1 is a side elevation of an engine provided with the improved gear. Fig. 2 is a side elevation of the reducing gear-wheel on the cam-shaft. Fig. 3 is a side elevation of the cam, and Fig. 4 is a longitudinal section in the axis of the cam-shaft on the line 4 4 of Fig. 1.

Referring specifically to the drawings, the main parts of the engine are indicated as follows: the bed of the engine at 5, the cylinder at 6, the valve-casing at 7, the valve-rod at 8, the sparker-rod at 9, the oil-pump at 10, the main crank-shaft at 11, the piston-rod at 22, and the vaporizer at 23. On the crank-shaft is a gear-wheel, (indicated in dotted lines at 24,) which meshes with a reducing gear-wheel 14 on the cam-shaft 15, whereby said shaft is rotated at a one-to-two ratio. At the end of the shaft is an eccentric stud 18, which is connected to and works the piston of the oil-pump. Fast on said shaft 15 is a symmetrical cam 19, which bears against an antifriction-roller on the end of the valve-rod and effects the movement thereof in one direction, the reciprocation being completed by a spring 8$^a$, which also causes the roller to follow the cam. The cam is symmetrical, so that it operates the valve similarly in both directions. The gear-wheel 14 is loose on the shaft, being preferably sleeved, as shown in Fig. 4, over the hub of a wheel-plate 12, which is fast on said shaft 15. Engagement between the wheel 14 and the plate 12 is effected by a stud 13, which projects laterally from the plate 12 into a concentric slot 16, produced in the wheel. The ends of the slots 16 are shaped to fit the stud, and the length of the slot is one-fourth of the wheel, the ends being exactly ninety degrees apart. The wheels are coupled and the rotation of the cam-shaft effected by engagement of the stud 13 in either end of the slot, according to the direction of rotation. The stud is held from unintentional disengagement by a spring 17, the tension of which requires a sharp jerk to overcome to shift the stud from one end to the other of the slot.

In operation when the engine is reversed the stud 13 is shifted from one end of the slot to the other, which reverses the action of the cam with respect to the valve by a quarter-revolution of the cam-shaft, which is equivalent to a half-revolution of the crank-shaft. The stroke of the oil-pump is also varied accordingly.

It will be seen that a very simple and effective gear is produced for the purpose intended.

The invention is not limited to the specific elements shown further than is indicated in the following claims, because an eccentric or a crank might be substituted for the cam or other changes made within the scope of the invention.

What I claim as new, and desire to secure by Letters Patent, is—

1. In an engine valve-gear, the combination with the crank-shaft, of a counter-shaft, a loose wheel thereon in gear with the crank-shaft and having a concentric slot, a coupling-stud fast on the counter-shaft and extending into the slot and shiftable therein to vary the relation of the wheel and shaft, and a valve-cam fast on the counter-shaft.

2. In an engine, the combination with the crank-shaft and a fuel-pump, of a counter-shaft having fast thereon a coupling-stud, a valve-cam, and a pump crank-pin, and a wheel loose on said counter-shaft in gear with the crank-shaft and having a concentric slot in which the stud is shiftable to reverse the engine.

In testimony whereof I have signed my name to this specification in the presence of two subscribing witnesses.

FRANK DICKINSON.

Witnesses:
 ANDY M. JOHNSON,
 ROSS W. BURGESS.